US010266054B2

(12) United States Patent
Nakajima et al.

(10) Patent No.: US 10,266,054 B2
(45) Date of Patent: Apr. 23, 2019

(54) VEHICLE DISPLAY DEVICE

(71) Applicant: YAZAKI CORPORATION, Tokyo (JP)

(72) Inventors: Harutoshi Nakajima, Shizuoka (JP); Akira Masuda, Shizuoka (JP)

(73) Assignee: YAZAKI CORPORATION, Minato-ku, Tokyo (JP)

(*) Notice: Subject to any disclaimer, the term of this patent is extended or adjusted under 35 U.S.C. 154(b) by 0 days.

(21) Appl. No.: 14/714,840

(22) Filed: May 18, 2015

(65) Prior Publication Data

US 2015/0328990 A1 Nov. 19, 2015

(30) Foreign Application Priority Data

May 19, 2014 (JP) ................................. 2014-103078

(51) Int. Cl.
*B60K 35/00* (2006.01)
*G12B 11/00* (2006.01)
*B60K 37/02* (2006.01)

(52) U.S. Cl.
CPC .............. *B60K 35/00* (2013.01); *B60K 37/02* (2013.01); *G12B 11/00* (2013.01);
(Continued)

(58) Field of Classification Search
CPC ...... B60K 2350/203; B60K 2350/2039; B60K 2350/2043; B60K 2350/2086; B60K 2350/2095; G12B 11/00
(Continued)

(56) References Cited

U.S. PATENT DOCUMENTS 4,730,881 A * 3/1988 Taguchi ................. B60Q 3/042
340/438
5,578,985 A * 11/1996 Cremers ................. B60K 37/02
340/459
(Continued)

FOREIGN PATENT DOCUMENTS

CN 101784412 A 7/2010
CN 102164768 A 8/2011
(Continued)

OTHER PUBLICATIONS

Communication dated Jan. 24, 2017, from the State Intellectual Property Office of P.R.C. in corresponding application No. 201510253447.4.
(Continued)

*Primary Examiner* — Zheng Song
(74) *Attorney, Agent, or Firm* — Sughrue Mion, PLLC

(57) ABSTRACT

A vehicle display device includes a display showing surface configured to form a showing area and show driving information in image through a display; a non-display showing surface provided around the display showing surface and configured to form the showing area and switch between showing and non-showing of a notification symbol based on turning-on or turning-off of a back-side light source; and a front-side light source arranged on a side opposite to the back-side light source with the non-display showing surface interposed therebetween, and configured to irradiate the non-display showing surface with light to draw a decorative pattern, regardless of the showing or the non-showing of the notification symbol on the non-display showing surface.

16 Claims, 2 Drawing Sheets

(52) U.S. Cl.
CPC .... *B60K 2350/106* (2013.01); *B60K 2350/20* (2013.01); *B60K 2350/203* (2013.01); *B60K 2350/206* (2013.01); *B60K 2350/2039* (2013.01); *B60K 2350/2091* (2013.01)

(58) Field of Classification Search
USPC .................................. 14/482, 489, 543–545
See application file for complete search history.

(56) References Cited

U.S. PATENT DOCUMENTS

| | | | | |
|---|---|---|---|---|
| 5,846,070 | A * | 12/1998 | Kim | F21S 19/00 362/276 |
| 6,409,355 | B1 * | 6/2002 | Simon | B60K 35/00 362/23.08 |
| 6,802,276 | B2 * | 10/2004 | Sugimoto | B60K 37/02 116/286 |
| 2002/0054440 | A1 | 5/2002 | Akamine et al. | |
| 2004/0189483 | A1 * | 9/2004 | Stringfellow | B60K 37/02 340/815.4 |
| 2006/0114571 | A1 * | 6/2006 | Kiesewetter | B60K 37/02 359/630 |
| 2007/0157745 | A1 * | 7/2007 | Takato | G01D 11/28 73/866.3 |
| 2007/0230170 | A1 * | 10/2007 | Mita | G09F 13/04 362/231 |
| 2011/0205162 | A1 | 8/2011 | Wäller et al. | |
| 2011/0210838 | A1 * | 9/2011 | Fujiki | G07C 5/0816 340/439 |
| 2012/0176813 | A1 * | 7/2012 | Holten | G02B 6/0018 362/606 |
| 2012/0218295 | A1 | 8/2012 | Hashikawa et al. | |
| 2012/0262901 | A1 * | 10/2012 | Ichihara | B60K 35/00 362/23.18 |
| 2013/0127897 | A1 * | 5/2013 | Baker | G09F 9/46 345/593 |
| 2013/0258678 | A1 * | 10/2013 | Nichols | F21V 11/16 362/351 |
| 2016/0221440 | A1 * | 8/2016 | Tane | B60K 35/00 |

FOREIGN PATENT DOCUMENTS

| | | | | |
|---|---|---|---|---|
| CN | 102596627 A | 7/2012 | | |
| JP | 62118380 A | 5/1987 | | |
| JP | 2001331132 A | 11/2001 | | |
| JP | 2002-96655 A | 4/2002 | | |
| JP | 2002-156251 A | 5/2002 | | |
| JP | 2004-69514 A | 3/2004 | | |
| JP | 2007-199026 A | 8/2007 | | |
| JP | 2008-122214 A | 5/2008 | | |
| JP | 2010083208 A | 4/2010 | | |
| JP | 2010-181316 A | 8/2010 | | |
| JP | 2012-201222 A | 10/2012 | | |
| JP | 2013192178 | * | 9/2013 | ............ B60K 35/00 |
| WO | 2011/064887 A1 | 6/2011 | | |

OTHER PUBLICATIONS

Communication dated Apr. 28, 2017 from the German Patent and Trademark Office in counterpart application No. 10 2015 209 065.5.
Communication dated Feb. 13, 2018, from the Japanese Patent Office in counterpart application No. 2014-103078.

* cited by examiner

VEHICLE DISPLAY DEVICE

CROSS-REFERENCE TO RELATED APPLICATIONS

The present application claims priority to and incorporates by reference the entire contents of Japanese Patent Application No. 2014-103078 filed in Japan on May 19, 2014.

BACKGROUND OF THE INVENTION

1. Field of the Invention

The present invention relates to a vehicle display device.

2. Description of the Related Art

As a conventional vehicle display device mounted on a vehicle, for example, Japanese Patent Application Laid-open No. 2004-069514 discloses a vehicle display device that is vertically arranged on an instrument panel in a vehicle, and includes an analog exclusive display with a dial plate for analog display where a design for analog display that is indicated with a indicating needle rotated by a movement is formed. This vehicle display device further includes a non-analog display for displaying a warning and the like that is arranged so as to be embedded in the instrument panel under the analog exclusive display.

In place of the analog exclusive display disclosed in Japanese Patent Application Laid-open No. 2004-069514, such a vehicle display device may use a liquid crystal display and the like for performing the same display as that of the analog exclusive display. In this case, in the conventional vehicle display device, for example, if a warning lamp forming the non-analog display is turned off, a whole picture of a showing area in the vehicle display device cannot be grasped and the showing area may be recognized to be present only on a liquid crystal display portion with respect to the showing area of the whole vehicle display device.

SUMMARY OF THE INVENTION

In view of the foregoing, the present invention provides a vehicle display device that enables a whole showing area to be easily grasped.

According to one aspect of the present invention, a vehicle display device includes a display showing surface configured to form a showing area and display driving information in image through a display; a non-display showing surface provided around the display showing surface and configured to form the showing area and switch between showing and non-showing of a notification symbol based on turning-on or turning-off of a back-side light source; and a front-side light source arranged on a side opposite to the back-side light source with the non-display showing surface interposed therebetween, and configured to irradiate the non-display showing surface with light to draw a decorative pattern, regardless of the showing or the non-showing of the notification symbol on the non-display showing surface.

According to another aspect of the present invention, in the vehicle display device, it is possible to configure that the display displays a background pattern in image as a background of the driving information on the display showing surface, and the decorative pattern cooperated with the background pattern displayed in image on the display showing surface of the display is drawn on the non-display showing surface by being irradiated with light from the front-side light source.

According to still another aspect of the present invention, in the vehicle display device, it is possible to configure that the decorative pattern and the background pattern are cooperated by having at least one of a drawing direction, a motif, a pattern, graphics, and a color in common.

According to still another aspect of the present invention, in the vehicle display device, it is possible to configure that the display is configured to include a first display having a first-display showing surface as the display showing surface, and a second display provided side by side with the first display and having a second-display showing surface as the display showing surface, and the background pattern on the first-display showing surface of the first display is cooperated with the background pattern on the second-display showing surface of the second display.

In the vehicle display device, the front-side light source also irradiates a non-showing area other than the showing area with light so as to draw the decorative pattern. More specifically, in the vehicle display device, the front-side light source also irradiates a non-showing area other than the showing area that is the non-showing area between the first-display showing surface and the second-display showing surface with light so as to draw the decorative pattern.

In the vehicle display device, the display showing surface is arranged on a driver's seat side of an instrument panel in a vehicle, and at least a part of the non-display showing surface may be arranged on a front passenger seat side in the vehicle than the display showing surface.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of the present invention will now be described with reference to the accompanying drawing. It should be noted that the embodiment below is not intended to limit the invention. Components in the embodiment include components that can be replaced by the skilled person and are easy to be made, or that are substantially identical.

Embodiment

Figure 1:
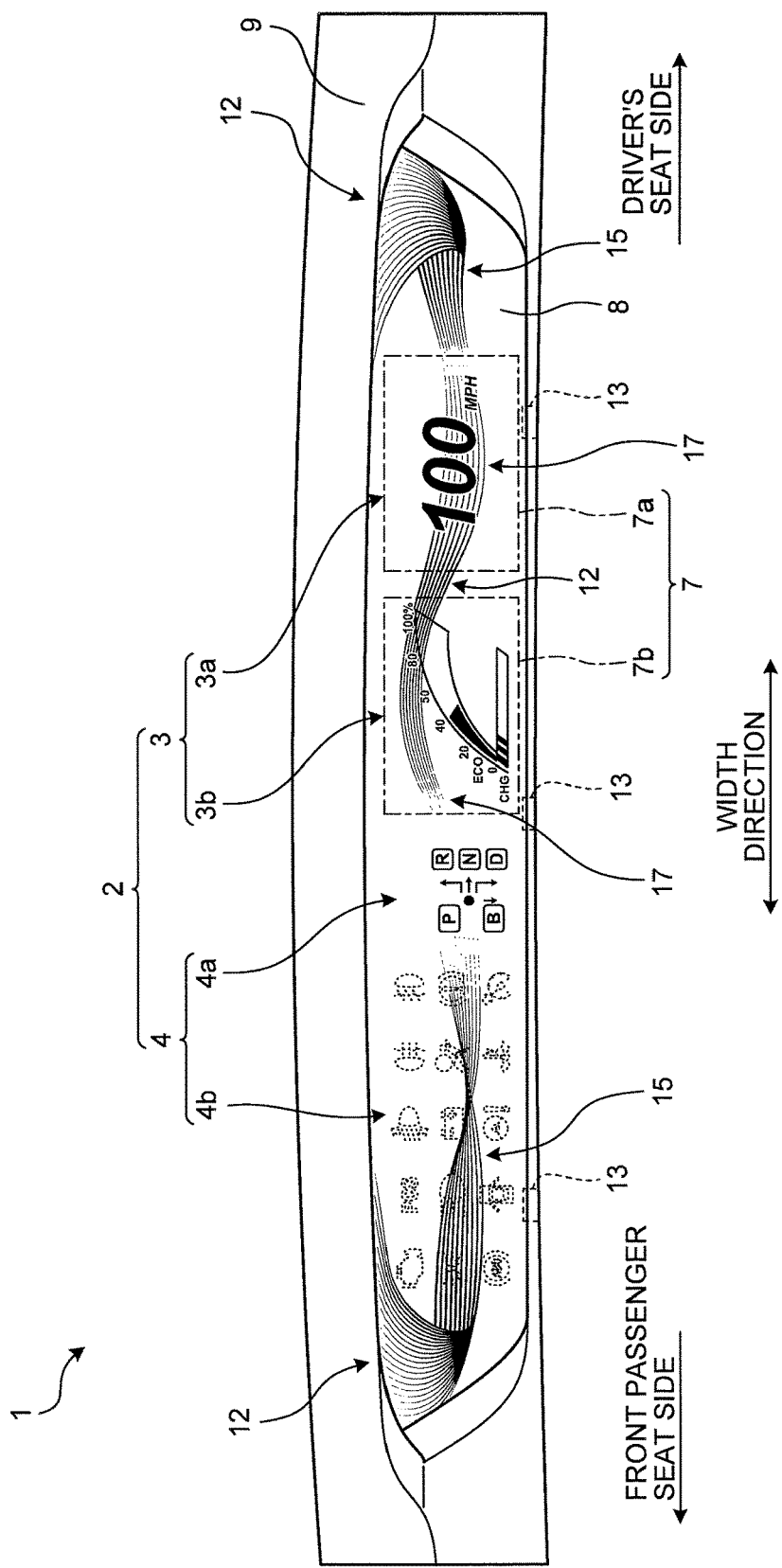
FIG. 1 is a front view illustrating a showing area of a vehicle display device according to an embodiment.
Figure 2:
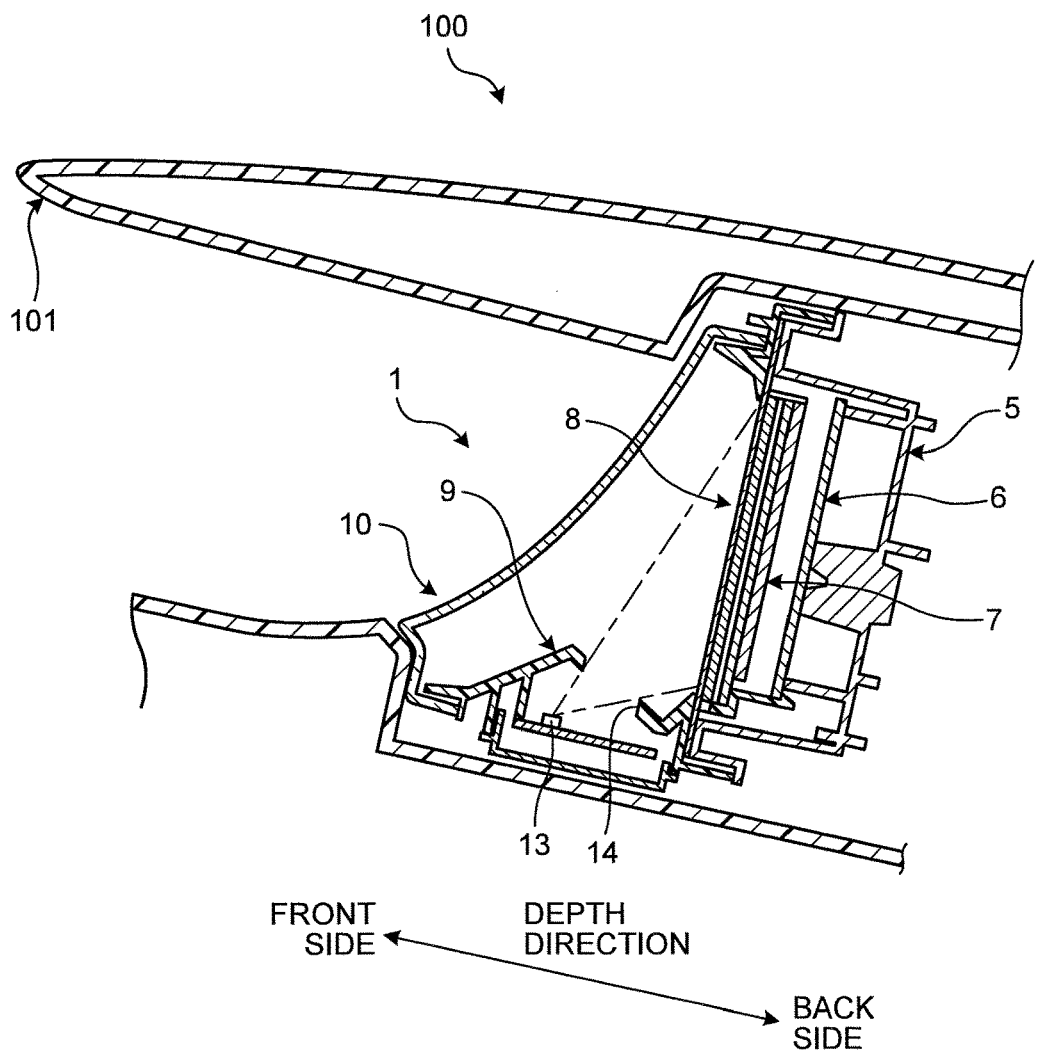
FIG. 2 is a schematic sectional view illustrating an installation state of the vehicle display device according to the embodiment.
Figure 3:
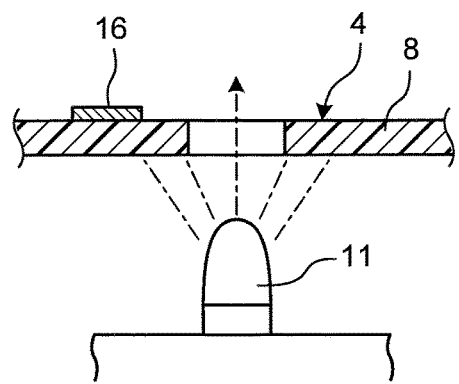
FIG. 3 is a schematic sectional view illustrating a configuration example of a non-display showing surface in the vehicle display device according to the embodiment.

FIG. 1 is a front view illustrating a showing area of a vehicle display device according to the embodiment. FIG. 2 is a schematic sectional view illustrating an installation state of the vehicle display device according to the embodiment. FIG. 3 is a schematic sectional view illustrating a configuration example of a non-display showing surface in the vehicle display device according to the embodiment.

A vehicle display device 1 according to the embodiment forms what is called a meter (measuring instrument) as illustrated in FIGS. 1 and 2. The vehicle display device 1 is mounted on an instrument panel 101 provided to a dashboard in a vehicle 100 such as cars, and displays various kinds of information used for driving the vehicle 100. The width direction of the vehicle display device 1 illustrated in FIG. 1 typically corresponds to a vehicle width direction of the vehicle 100 to which this vehicle display device 1 is applied. In the width direction of the vehicle display device 1, one side toward the front face of the vehicle display device 1 (right side of FIG. 1) corresponds to a driver's seat side of the vehicle 100, and the other side toward the front face of the vehicle display device 1 (left side of FIG. 1) corresponds to a front passenger seat side of the vehicle 100. The depth direction of the vehicle display device 1 illustrated in FIG. 2 typically corresponds to the front-back direction of the vehicle 100 to which this vehicle display device 1 is applied. The front side of the vehicle display device 1 is the side facing a driver's seat of the vehicle 100, and is typically the side visually recognized by a driver sat on the driver's seat. The back side of the vehicle display device 1 is opposite to the front side in the depth direction, and is typically held inside the instrument panel 101.

The vehicle display device 1 includes a showing area 2 that performs various kinds of displays on the surface of the front side. More specifically, the vehicle display device 1 includes a display showing surface 3 and a non-display showing surface 4, and these display showing surface 3 and non-display showing surface 4 form the showing area 2.

A description will be made of a basic configuration of the vehicle display device 1. The vehicle display device 1 includes a case back cover 5, a substrate 6, a display 7, a dial plate 8, a facing plate 9, and a transparent protective member 10. The vehicle display device 1 is configured by laminating the case back cover 5, the substrate 6, the display 7, the dial plate 8, the facing plate 9, and the transparent protective member 10 in this order from the back side to the front side in the depth direction. The case back cover 5 is a part of the case where various kinds of components forming the vehicle display device 1 are assembled and these components are stored. The substrate 6 is provided with various kinds of electronic components used for achieving various kinds of functions in the vehicle display device 1. The display 7 is driven and controlled through the substrate 6 and the like, and displays various kinds of images on the display showing surface 3. For example, a thin liquid crystal display may be used as the display 7, but the display 7 is not limited to this. A plasma display, an organic electroluminescent (EL) display and the like may be used. The dial plate 8 is a plate-like member where various kinds of symbols, characters, graphics and the like are drawn. The dial plate 8 is irradiated with light from the back side, and the emitted light passes through a part where symbols, characters, graphics and the like are drawn so as to light and display the symbols, characters, graphics and the like (which will be described in detail later). The facing plate 9 is a frame-like member that surrounds a periphery of the dial plate 8 and presses the dial plate 8 and the like. The transparent protective member 10 covers the front face of the dial plate 8 and the like, and is made of a transparent material so that the showing area 2 and the like can be visually recognized through the transparent protective member 10.

The display showing surface 3 in the embodiment displays driving information in image through the display 7. In the vehicle display device 1, the surface of the display 7 on the front side is exposed from the dial plate 8, and the surface of the display 7 on the front side forms the display showing surface 3. The display 7 in the embodiment includes at least a first display 7a and a second display 7b. The first display 7a includes a first-display showing surface 3a as the display showing surface 3. The second display 7b is provided side by side with the first display 7a, and includes a second-display showing surface 3b as the display showing surface 3. In other words, the display showing surface 3 in the embodiment includes the first-display showing surface 3a and the second-display showing surface 3b. The first display 7a and the second display 7b are arranged side by side in the depth direction, in other words, the first-display showing surface 3a and the second-display showing surface 3b are arranged side by side in the depth direction. In the vehicle display device 1, the first display 7a and the first-display showing surface 3a are arranged on a driver's seat side, and the second display 7b and the second-display showing surface 3b are arranged on a front passenger seat side. The driving information that the first display 7a and the second display 7b display in image may include, other than information related to speed, eco-travel and the like of the vehicle 100 exemplified in FIG. 1, for example, various kinds of information related to driving that vary every moment at the time of driving the vehicle 100 such as an integrated travel distance, a cooling water temperature, output rotation speed of a power source for traveling, a residual fuel amount, and a battery storage amount.

The non-display showing surface 4 is provided around the display showing surface 3. The non-display showing surface 4 is provided at least on a front passenger seat side of the second display 7b in the depth direction, but is not limited to this. The non-display showing surface 4 may be provided on a driver's seat side of the first display 7a. The display showing surface 3 is arranged on a driver's seat side of the instrument panel 101 in the vehicle 100, and at least a part of the non-display showing surface 4 is arranged on a front passenger seat side in the vehicle 100 than the display showing surface 3.

The non-display showing surface 4 switches between the showing and the non-showing of notification symbols for notifying a driver and the like of various kinds of information based on the turning-on or the turning-off of back-side light sources 11 as illustrated in FIG. 3 and the like. The back-side light sources 11 are arranged on the back side of the dial plate 8, in the case back cover 5 in the embodiment. In the vehicle display device 1, the back-side light sources 11 turn on, the back-side light sources 11 irradiate symbols, characters, graphics and the like drawn on the dial plate 8 with light, and the emitted light passes through a part where the symbols, the characters, the graphics and the like are drawn so as to show various kinds of notification symbols as illustrated in FIG. 3 and the like. In the vehicle display device 1, the back-side light sources 11 turn off so as to non-show various kinds of notification symbols. In the vehicle display device 1, a surface of the front side of this dial plate 8 forms the non-display showing surface 4. In the dial plate 8 that is, for example, a polycarbonate sheet of a transparent material, shapes corresponding to the notification symbols are hollowed and are black-printed so as to draw the notification symbols. When light from the back-side light sources 11 passes through a part hollowed corresponding to the notification symbols, the notification symbols are lighted and shown on the non-display showing surface 4. Each of the back-side light sources 11 is formed of, for example, light emitting diode (LED) elements and a plurality of back-side light sources 11 are provided corresponding to the notification symbols. The back-side light sources 11 are driven and controlled through the substrate 6 and the like.

The non-display showing surface 4 in the embodiment includes at least a shift position indicator 4a that shows a current shift position symbol as the notification symbol and a warning display (what is called telltale) 4b that displays various kinds of warning symbols (what is called warning lamp) as the notification symbols. In the shift position indicator 4a, for example, icons representing "P", "R", "N", "D", "B" and the like are drawn as shift position symbols. For example, after all shift position symbols are lighted and shown, a shift position symbol corresponding to the current shift position is shown in a form different from those of other shift position symbols. In the warning display 4b, icons representing various kinds of warnings including a "half-closed door warning", a "brake warning", an "anti-lock braking system (ABS) warning", a "check engine warning", and a "battery warning" are drawn as warning symbols. For example, the warning display 4b lights and shows a warning symbol corresponding to an event that is currently required to be warned, and turns off and non-shows a warning symbol corresponding to an event that is not required to be warned. In the vehicle display device 1, the shift position indicator 4a is arranged on a driver's seat side, and the warning display 4b is arranged on a front passenger seat side. In FIG. 1, the warning symbols are illustrated by dotted lines and represent turning-off states (non-display states). In the description, the non-display showing surface 4 is described as what displays the shift position symbols, the warning symbols and the like as the notification symbols, but is not limited to this. For example, the non-display showing surface 4 may show a direction indicating symbol that is formed of icons and the like representing a direction where the direction is indicated.

The vehicle display device 1 also includes a non-showing area 12 other than the showing area 2 including the display showing surface 3 and the non-display showing surface 4. The non-showing area 12 displays no driving information and notification symbols. The non-showing area 12 is provided, for example, on a front passenger seat side of the warning display 4b, between the first-display showing surface 3a and the second-display showing surface 3b, on a driver's seat side of the first-display showing surface 3a and the like, but is not limited to this.

The vehicle display device 1 in the embodiment further including front-side light sources 13 as illustrated in FIGS. 1 and 2 enables a driver to grasp the whole showing area 2.

More specifically, the front-side light sources 13 are arranged on the side opposite to the back-side light sources 11 with the non-display showing surface 4 interposed therebetween in the depth direction. Each of the front-side light sources 13 is formed of, for example, the LED elements and the like. The front-side light sources 13 are driven and controlled through the substrate 6 and the like. The front-side light sources 13 are provided on the front side of the dial plate 8 and on the vertically lower side of the facing plate 9. The front-side light sources 13 irradiate the non-display showing surface 4 and the like with light through a slit 14 formed on the facing plate 9. Three front-side light sources 13 are provided at substantially equal intervals in the width direction, but are not limited to this. One or two front-side light sources 13 may be provided, and four front-side light sources 13 or more may be provided. The front-side light sources 13 may be provided on the vertically upper side of the facing plate 9.

The front-side light source 13 irradiates the non-display showing surface 4 with light and draws a certain decorative pattern 15 regardless of the showing or the non-showing of the notification symbols on the non-display showing surface 4. In the example of FIG. 1, the front-side light source 13 draws the decorative pattern 15 on the warning display 4b of the non-display showing surface 4, and draws no decorative pattern 15 on the shift position indicator 4a, but is not limited to this. The front-side light source 13 may draw the decorative pattern 15 on the shift position indicator 4a. The front-side light source 13 irradiates the non-display showing surface 4 with light from the front side, superimposes and draws the decorative pattern 15 on the notification symbols of the non-display showing surface 4, and forms a certain decorative design.

Various techniques are used for drawing the decorative pattern 15 by irradiating the non-display showing surface 4 with light of the front-side light source 13. For example, as exemplified in FIG. 3, the vehicle display device 1 prints the decorative pattern 15 on the non-display showing surface 4 using an ink 16 with a relatively high reflectivity and the like so as to make the reflectivity of the decorative pattern 15 portion higher than those of other portions. In this manner, the vehicle display device 1 can draw the decorative pattern 15 on the non-display showing surface 4 by irradiating the non-display showing surface 4 with light of the front-side light source 13. The vehicle display device 1 may draw the decorative pattern 15 on the non-display showing surface 4, for example, by forming grooves corresponding to the decorative pattern 15 on the non-display showing surface 4 and irradiating the non-display showing surface 4 with light of the front-side light source 13. The vehicle display device 1 may draw the decorative pattern 15 on the non-display showing surface 4 by making the surface roughness of the decorative pattern 15 portion different from that of other portions on the non-display showing surface 4 and irradiating the non-display showing surface 4 with light of the front-side light source 13. The vehicle display device 1 may draw the decorative pattern 15 on the non-display showing surface 4, for example, by forming the slit 14 into a shape corresponding to the decorative pattern 15 and irradiating the non-display showing surface 4 with light of the front-side light source 13.

The vehicle display device 1 in the embodiment causes the front-side light source 13 to irradiate the non-showing area 12 other than the showing area 2 with light so as to draw the decorative pattern 15. The vehicle display device 1 may include the facing plate 9 in the non-showing area 12, and cause the front-side light source 13 to irradiate the facing plate 9 with light so as to draw the decorative pattern 15. In this case, the technique for drawing the decorative pattern 15 on the non-showing area 12 may be substantially similar to the case of the non-display showing surface 4.

The display 7 in the embodiment displays in image background patterns 17 as a background of the driving information on the display showing surface 3. The background patterns 17 are typically patterns irrelevant to various kinds of information used for driving the vehicle 100, and are distinguished from the driving information and displayed in image. The decorative pattern 15 in the embodiment is drawn as a pattern in cooperation with the background patterns 17 displayed in image on this display showing surface 3. In other words, the decorative pattern 15 in cooperation with the background patterns 17 displayed in image on this display showing surface 3 of the display 7 is drawn on the non-display showing surface 4 by being irradiated with light from the front-side light source 13. This decorative pattern 15 is typically a pattern irrelevant to various kinds of information used for driving the vehicle 100 similarly to the background patterns 17. Furthermore, in the vehicle display device 1, the background pattern 17 on the first-display showing surface 3a of the first display 7a is cooperated with the background pattern 17 on the second-display showing surface 3b of the second display 7b, and the decorative pattern 15 drawn on the non-showing area 12 by being irradiated with light from the front-side light source 13 is also cooperated with the background patterns 17.

In other words, this vehicle display device 1 has the decorative pattern 15 drawn on the warning display 4b on the non-display showing surface 4 by the front-side light source 13, the decorative pattern 15 drawn on the non-showing area 12 by the front-side light source 13, the background pattern 17 on the first-display showing surface 3a, and the background pattern 17 on the second-display showing surface 3b related to and cooperated with each other.

When having, for example, at least one of the drawing direction, the motif, the pattern, the graphics, and the color in common, these decorative patterns 15 and background patterns 17 are cooperated. In the example of FIG. 1, the decorative patterns 15 and the background patterns 17 have the motif drawn by a bundle of a plurality of curves in common, and the motif is drawn in a common color or in a similar color and is continuous in the common drawing direction (direction along with the width direction in the embodiment). Thus, the decorative patterns 15 and the background patterns 17 are related to and cooperated with each other. In the embodiment, when the decorative patterns 15 and the background patterns 17 are continuous, the case is not limited to the case where the decorative patterns 15 and the background patterns 17 are physically continuous, and includes the case where the decorative patterns 15 and the background patterns 17 seem to be continuous in the visual effects even when a slight gap is present as exemplified in FIG. 1. The decorative patterns 15 and the background patterns 17 are not limited to the example illustrated in FIG. 1, and may be cooperated, for example, by having a certain pattern such as a dot in common or may be cooperated by using common graphics. When ignition of the vehicle 100 is turned on, the decorative patterns 15 and the background patterns 17 typically start being displayed.

The vehicle display device 1 described above includes the display showing surface 3, the non-display showing surface 4, and the front-side light sources 13. The display showing surface 3 forms the showing area 2, and displays the driving information in image through the display 7. The non-display showing surface 4 is provided around the display showing surface 3 so as to form the showing area 2, and switches between showing and non-showing of the notification symbols based on the turning-on or turning-off of the back-side light sources 11. The front-side light sources 13 are arranged on the side opposite to the back-side light sources 11 with the non-display showing surface 4 interposed therebetween, and irradiate the non-display showing surface 4 with light regardless of the display/non-display of the notification symbols on the non-display showing surface 4 so as to draw the decorative pattern 15.

Thus, in the vehicle display device 1, the display showing surface 3 and the non-display showing surface 4 form the showing area 2, and the front-side light source 13 irradiates the non-display showing surface 4 with light from the front side so as to draw the decorative pattern 15. Even when the non-display showing surface 4 is in a non-showing state, the decorative pattern 15 is drawn on the non-display showing surface 4 by light from the front-side light source 13. In this manner, the vehicle display device 1 can prevent the recognition that the showing area 2 is present only on the display showing surface 3 portion. Accordingly, this vehicle display device 1 enables the whole showing area 2 to be easily grasped.

More specifically, the vehicle display device 1 can relatively expand an area for displaying something at all the time in the showing area 2 by drawing the decorative pattern 15 on the warning display 4b on the non-display showing surface 4 that shows the notification symbols and tends to show nothing at a normal time with respect to the display showing surface 3 that tends to show the driving information and the like substantially at all the time at the time of driving the vehicle 100. In this manner, the vehicle display device 1 enables a driver to easily recognize a whole image of the showing area 2 and to easily recognize the combined display showing surface 3 and non-display showing surface 4 as one big showing area 2.

In the vehicle display device 1 described above, the display 7 displays in image the background patterns 17 as a background of the driving information on the display showing surface 3, and the decorative pattern 15 cooperated with the background patterns 17 that are displayed in image on the display showing surface 3 of the display 7 is drawn on the non-display showing surface 4 by being irradiated with light from the front-side light source 13. In this manner, the vehicle display device 1 enables the whole showing area 2 to be easily grasped, and, even when the showing area 2 is formed by combining the surfaces in different format, in other words, the display showing surface 3 and the non-display showing surface 4, can form a decorative design on the whole showing area 2 using the mutually cooperated decorative pattern 15 and background patterns 17. Accordingly, the vehicle display device 1 can improve a sense of unity of the showing area 2 and enables the whole showing area 2 to be more easily grasped.

In this case, in the vehicle display device 1, the decorative pattern 15 and the background patterns 17 are cooperated by having at least one of the drawing direction, the motif, the pattern, the graphics, and the color in common. Accordingly, the vehicle display device 1 causes the decorative pattern 15 and the background patterns 17 to be cooperated so as to provide a sense of unity.

Furthermore, in the vehicle display device 1 described above, the display 7 includes at least the first display 7a including the first-display showing surface 3a as the display showing surface 3, and the second display 7b provided side by side with the first display 7a and including the second-display showing surface 3b as the display showing surface 3. The background pattern 17 on the first-display showing surface 3a of the first display 7a and the background pattern 17 on the second-display showing surface 3b of the second display 7b are cooperated. Even when the display showing surface 3 is formed of a plurality of displays 7, the vehicle display device 1 enables the whole showing area 2 to be easily grasped without losing a sense of unity of the whole showing area 2.

In addition, in the vehicle display device 1 described above, the front-side light source 13 also irradiates the non-showing area 12 other than the showing area 2 with light so as to draw the decorative pattern 15. In this manner, the vehicle display device 1 can improve a sense of unity of the whole vehicle display device 1 including the non-showing area 12 in addition to the showing area 2. In this case, the vehicle display device 1 can more improve a sense of unity between the first-display showing surface 3a and the second-display showing surface 3b by drawing the decorative pattern 15 especially between the first-display showing surface 3a and the second-display showing surface 3b. In other words, even when the display showing surface 3 is formed by arranging a plurality of relatively small first displays 7a and second displays 7b, the front-side light source 13 also irradiates the non-showing area 12 between the first-display showing surface 3a and the second-display showing surface 3b with light and draws the decorative pattern 15 so as to improve a sense of unity of the display showing surface 3. In this manner, the vehicle display device 1 can exhibit visual effects substantially similar to a case where the display showing surface 3 is formed of a relatively large display.

Furthermore, in the vehicle display device 1 described above, the display showing surface 3 is arranged on a driver's seat side of the instrument panel 101 in the vehicle 100, and at least a part of the non-display showing surface 4 is arranged on a front passenger seat side in the vehicle 100 than the display showing surface 3. The vehicle display device 1 enables the whole display showing surface 3 and non-display showing surface 4 to be easily recognized as one showing area 2, and enables the driving information that tends to be displayed at all the time and is more likely to be checked by a driver to be displayed on the display showing surface 3 on a driver's seat side, and the notification symbols that tend to be non-shown at a normal time and are less likely to be checked by a driver to be shown on the non-display showing surface 4 on a front passenger seat side separated from a driver's seat.

The vehicle display device according to the embodiment of the present invention is not limited to the embodiment, and various changes and modifications can be made without departing from the gist and scope of the present invention.

As described above, the display 7 includes at least the first display 7a including the first-display showing surface 3a as the display showing surface 3, and the second display 7b provided side by side with the first display 7a and including the second-display showing surface 3b as the display showing surface 3, but is not limited to this. The number of the display 7 and the display showing surface 3 may be one, and may be three or more.

The vehicle display device 1 described above has the decorative pattern 15 drawn on the warning display 4b on the non-display showing surface 4 by the front-side light source 13, the decorative pattern 15 drawn on the non-showing area 12 by the front-side light source 13, the background pattern 17 on the first-display showing surface 3a, and the background pattern 17 on the second-display showing surface 3b cooperated with each other, but is not limited to this. A part of the decorative patterns 15 and the background patterns 17 may be cooperated, and all of them may be irrelevant.

In a vehicle display device according to the present invention, a display showing surface and a non-display showing surface form a showing area, and a front-side light source irradiates the non-display showing surface with light from the front side so as to draw a decorative pattern. Even when the non-display showing surface is in a non-display state, the decorative pattern is drawn on the non-display showing surface by light from the front-side light source. In this manner, the vehicle display device can prevent the recognition that the showing area is present only on the display showing surface portion. Accordingly, this vehicle display device enables the whole showing area to be easily grasped.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
   a display showing surface configured to form a showing area and show driving information in image through a display;
   a non-display showing surface provided around the display showing surface and configured to form the showing area and switch between showing and non-showing of a notification symbol based on turning-on or turning-off of a back-side light source; and
   a front-side light source arranged on a side opposite to the back-side light source with the non-display showing surface interposed therebetween, and configured to irradiate the non-display showing surface with light thereby illuminating a decorative pattern extending across a plurality of the notification symbols each corresponding to different events, regardless of the showing or the non-showing of the notification symbols on the non-display showing surface,
   wherein the display displays a background pattern in image as a background of the driving information on the display showing surface,
   wherein the decorative pattern cooperated with the background pattern displayed in image on the display showing surface of the display is drawn on the non-display showing surface by being irradiated with light from the front-side light source, and
   wherein the background pattern extends across a plurality of separate and backlit displays and the decorative pattern extends across the plurality of notification symbols each outside of the separate and backlit displays.

2. The vehicle display device according to claim 1, wherein
   the decorative pattern and the background pattern are cooperated by having at least one of a drawing direction, a motif, a pattern, graphics, and a color in common.

3. The vehicle display device according to claim 2, wherein
   the display is configured to include a first display having a first-display showing surface as the display showing surface, and a second display provided side by side with the first display and having a second-display showing surface as the display showing surface, and
   the background pattern on the first-display showing surface of the first display is cooperated with the background pattern on the second-display showing surface of the second display.

4. The vehicle display device according to claim 1, wherein
   the display is configured to include a first display having a first-display showing surface as the display showing surface, and a second display provided side by side with the first display and having a second-display showing surface as the display showing surface, and
   the background pattern on the first-display showing surface of the first display is cooperated with the background pattern on the second-display showing surface of the second display.

5. The vehicle display device according to claim 1, wherein the non-display showing surface further comprises the decorative pattern printed thereon as a reflective ink having a higher reflectivity than other portions of the non-display showing surface.

6. The vehicle display device according to claim 1, wherein
the non-display showing surface further comprises grooves therein corresponding to the decorative pattern.

7. The vehicle display device according to claim 1, wherein
the non-display showing surface further comprises the decorative pattern as a portion of the non-display showing surface having a surface roughness greater than that of other portions of the non-display showing surface.

8. The vehicle display device according to claim 1, further comprising:
a slit provided between the front-side light source and the non-display showing surface, the slit comprising a corresponding shape of the decorative pattern such that irradiation from the front-side light source passes through the slit into the decorative pattern and onto the non-display showing surface.

9. The vehicle display device according to claim 1, wherein
the decorative pattern is continuous across a plurality of warning symbols of the non-display showing surface.

10. The vehicle display device according to claim 1, wherein the decorative pattern is extended away from both sides of the background pattern in width direction from a passenger seat side to a driver seat side of a vehicle having the vehicle display device.

11. The vehicle display device according to claim 1, wherein the plurality of notification symbols corresponds to a plurality of a half-closed door warning, a brake warning, an anti-lock braking system warning, a check engine warning and a battery warning.

12. The vehicle display device according to claim 1, wherein
the decorative pattern is superimposed upon the notification symbols.

13. A vehicle display device comprising:
a display showing surface configured to form a showing area and show driving information in image through a display;
a non-display showing surface provided around the display showing surface and configured to form the showing area and switch between showing and non-showing of a plurality of notification symbols based on turning-on or turning-off of a back-side light source; and
a front-side light source arranged on a side opposite to the back-side light source with the non-display showing surface interposed therebetween, and configured to irradiate the nondisplay showing surface with light thereby illuminating a decorative pattern extending across the notification symbols regardless of the showing or the non-showing of the notification symbols on the non-display showing surface such that the decorative pattern is illuminated by the front-side light source in a state in which the notification symbols are not illuminated by the back-side light source and during a period in which a warning state is not indicated,
wherein the display displays a background pattern in image as a background of the driving information on the display showing surface,
wherein the decorative pattern cooperated with the background pattern displayed in image on the display showing surface of the display is drawn on the non-display showing surface by being irradiated with light from the front-side light source, and
wherein the background pattern extends across a plurality of separate and backlit displays and the decorative pattern extends across the plurality of notification symbols each outside of the separate and backlit displays.

14. The vehicle display device according to claim 13, wherein
the decorative pattern is superimposed upon the notification symbols.

15. A vehicle display device comprising:
a display showing surface configured to form a showing area and show driving information in image through a display;
a non-display showing surface provided around the display showing surface and configured to form the showing area and switch between showing and non-showing of a notification symbol based on turning-on or turning-off of a back-side light source; and
a front-side light source arranged on a side opposite to the back-side light source with the non-display showing surface interposed therebetween, and configured to irradiate the non-display showing surface with light thereby illuminating a decorative pattern extending across a plurality of the notification symbols each corresponding to different events, regardless of the showing or the non-showing of the notification symbols on the non-display showing surface,
wherein the display displays a background pattern in image as a background of the driving information on the display showing surface,
wherein the decorative pattern cooperated with the background pattern displayed in image on the display showing surface of the display is drawn on the non-display showing surface by being irradiated with light from the front-side light source, and
wherein the decorative pattern is extended away from both sides of the background pattern in width direction from a passenger seat side to a driver seat side of a vehicle having the vehicle display device.

16. The vehicle display device according to claim 15, wherein
the front-side light source illuminates the decorative pattern in a state in which the notification symbols are not illuminated by the back-side light source and during a period in which a warning state is not indicated.

* * * * *